United States Patent
Tong et al.

(10) Patent No.: US 10,205,167 B2
(45) Date of Patent: *Feb. 12, 2019

(54) HIGH ENERGY MATERIALS FOR A BATTERY AND METHODS FOR MAKING AND USE

(71) Applicant: Wildcat Discovery Technologies, Inc., San Diego, CA (US)

(72) Inventors: Wei Tong, San Diego, CA (US); Steven Kaye, San Diego, CA (US); David Keogh, San Diego, CA (US); Cory O'Neill, San Diego, CA (US)

(73) Assignee: Wildcat Discovery Technologies, Inc., San Diego, CA (US)

(*) Notice: Subject to any disclaimer, the term of this patent is extended or adjusted under 35 U.S.C. 154(b) by 146 days.

This patent is subject to a terminal disclaimer.

(21) Appl. No.: 14/837,674

(22) Filed: Aug. 27, 2015

(65) Prior Publication Data
US 2015/0364763 A1    Dec. 17, 2015

Related U.S. Application Data

(63) Continuation of application No. 14/220,047, filed on Mar. 19, 2014, now Pat. No. 9,159,994.

(51) Int. Cl.
*H01M 4/00* (2006.01)
*H01M 10/00* (2006.01)
(Continued)

(52) U.S. Cl.
CPC ............ *H01M 4/582* (2013.01); *H01M 4/136* (2013.01); *H01M 4/626* (2013.01); *H01M 10/052* (2013.01)

(58) Field of Classification Search
CPC ...... H01M 4/582; H01M 4/136; H01M 4/626; H01M 10/052; Y02E 60/122
(Continued)

(56) References Cited

U.S. PATENT DOCUMENTS 4,725,422 A    2/1988    Miyabayashi et al.
5,378,560 A    1/1995    Tomiyama
(Continued)

FOREIGN PATENT DOCUMENTS

CN    101794877 A    8/2010
CN    101752561 B    8/2012
(Continued)

OTHER PUBLICATIONS

Liu et al. "Excellent cycle performance of Co-doped FeF3/C nanocomposite cathode material for lithium-ion batteries". Jul. 2012. Journal of Materials Chemistry. J. Mater. Chem., 2012, 22, 17539-17550. Total pp. 12.*
(Continued)

*Primary Examiner* — Harold Y Pyon
*Assistant Examiner* — Danny N Kang
(74) *Attorney, Agent, or Firm* — Corridor Law Group, P.C.

(57) ABSTRACT

A composition for forming an electrode. The composition includes a metal fluoride compound doped with a dopant. The addition of the dopant: (i) improves the bulk conductivity of the composition as compared to the undoped metal fluoride compound; (ii) changes the bandgap of the composition as compared to the undoped metal fluoride compound; or (iii) induces the formation of a conductive metallic network. A method of making the composition is included.

12 Claims, 3 Drawing Sheets

(51) Int. Cl.
*H01M 4/58* (2010.01)
*H01M 4/136* (2010.01)
*H01M 4/62* (2006.01)
*H01M 10/052* (2010.01)

(58) Field of Classification Search
USPC .............................................. 252/500, 519.4
See application file for complete search history.

(56) References Cited

U.S. PATENT DOCUMENTS

| | | | |
|---|---|---|---|
| 6,346,349 | B1 | 2/2002 | Briscoe et al. |
| 6,613,213 | B1 | 9/2003 | Reilly et al. |
| 6,810,061 | B2 | 10/2004 | Hori et al. |
| 6,964,827 | B2 | 11/2005 | Barker et al. |
| 7,261,872 | B2 | 8/2007 | Greer |
| 7,371,338 | B2 | 5/2008 | Amatucci |
| 7,625,671 | B2 | 12/2009 | Amatucci |
| 7,947,392 | B2 | 5/2011 | Amatucci et al. |
| 8,039,149 | B2 | 10/2011 | Amatucci et al. |
| 8,119,285 | B2 | 2/2012 | Hatta et al. |
| 8,257,866 | B2 | 9/2012 | Loveness et al. |
| 8,916,062 | B2 | 12/2014 | Tong et al. |
| 9,099,735 | B2 | 8/2015 | Caldwell et al. |
| 2003/0027049 | A1 | 2/2003 | Barker et al. |
| 2005/0062404 | A1 | 3/2005 | Jones et al. |
| 2005/0191554 | A1 | 9/2005 | Soga |
| 2006/0019163 | A1* | 1/2006 | Amatucci ............... H01M 4/58 429/220 |
| 2006/0035148 | A1 | 2/2006 | Balaya et al. |
| 2007/0243466 | A1 | 10/2007 | Amatucci et al. |
| 2007/0285498 | A1 | 12/2007 | Shiomi |
| 2008/0199772 | A1 | 8/2008 | Amatucci et al. |
| 2009/0186276 | A1 | 7/2009 | Zhamu et al. |
| 2009/0220858 | A1 | 9/2009 | Cheng et al. |
| 2009/0246636 | A1* | 10/2009 | Chiang ................. H01M 2/166 429/231.95 |
| 2010/0123116 | A1 | 5/2010 | Ghenciu et al. |
| 2010/0261063 | A1 | 10/2010 | Kitagawa et al. |
| 2010/0297499 | A1 | 11/2010 | Tong et al. |
| 2011/0229761 | A1 | 9/2011 | Cui et al. |
| 2012/0305855 | A1 | 12/2012 | Kim et al. |
| 2013/0065126 | A1 | 3/2013 | Caldwell et al. |
| 2013/0264512 | A1* | 10/2013 | Kwon .................... H01F 1/015 252/62.55 |

FOREIGN PATENT DOCUMENTS

| | | |
|---|---|---|
| EP | 0165047 B1 | 10/1997 |
| EP | 2511973 A1 | 10/2012 |
| GB | 1383957 A | 2/1974 |
| JP | 1998112333 A | 4/1998 |
| JP | H11329415 A | 11/1999 |
| JP | 2001015111 A | 1/2001 |
| JP | 2002015727 A | 1/2002 |
| JP | 2002237334 A | 8/2002 |
| JP | 2002373643 A | 12/2002 |
| JP | 2007515762 A | 6/2007 |
| JP | 2008186595 A | 8/2008 |
| JP | 2010518560 A | 5/2010 |
| JP | 2013513904 A | 4/2013 |
| KR | 1020060109305 A | 10/2006 |
| KR | 1020070117826 A | 12/2007 |
| WO | 2004034489 A | 4/2004 |
| WO | 2004051772 A | 6/2004 |
| WO | 2005062404 A1 | 7/2005 |
| WO | 2008095197 A2 | 8/2008 |
| WO | 2008100002 A1 | 8/2008 |
| WO | 2009048146 A1 | 4/2009 |
| WO | 2011069348 A1 | 6/2011 |

OTHER PUBLICATIONS

Badway et al., "High-Capacity Reversible Metal Fluoride Conversion Materials as Rechargeable Positive Electrodes for Li Batteries", Journal of the Electrochemical Society, 150, 10, A1318-A1327, 2001.

Badway et al., "Next Generation Positive Electrode Materials Enabled by Nanocomposites:—Metal Fluorides—", MRS Proceedings. vol. 756. No. 1. Cambridge University Press, 2002.

Badway et al., "Structure and Electrochemistry of Copper Fluoride Nanocomposites Utilizing Mixed Conducting Matrices", Chem. Mater. 2007, 19, 4129-4141.

International Search Report and Written Opinion dated Aug. 14, 2014 in International Application No. PCT/US2014/028478.

International Search Report and Written Opinion dated Jul. 25, 2014 in International Application No. PCT/US2014/028506.

Liu, Li et al., "Excellent cycle performance of Co-doped FeF3/C nanocomposite cathode material for lithium-ion batteries," J. Mater. Chem., 2012, 22, 17539-17550.

Liu, Xiu-ming et al., "Effects of MoO3 encapsulating on performances of CuF2 cathode material for application of lithium primary batteries," The Chinese Journal of Nonferrous Metals, Feb. 2010, vol. 20 No. 2, 288-292.

Mansour, A.N. et al., "In situ X-ray absorption spectroscopic investigation of the electrochemical conversion reactions of CuF2—MoO3 nano composite," Journal of Solid State Chemistry 183 (2010) 3029-3038; Oct. 8, 2010.

Badway, F. et al., "Structure and Electrochemistry of Copper Fluoride Nanocomposites Utilizing Mixed Conducting Matrices", Chemistry of Materials, vol. 19, No. 17, Aug. 1, 2007, pp. 4129-4141.

Mansour, A.N. et al., "In situ X-ray absorption spectroscopic investigation of the electrochemical conversion reactions of CuF2-Mo03 nanocomposite", Journal of Solid State Chemistry, vol. 183, No. 12, Oct. 8, 2010, pp. 3029-3038.

Non-Final Office Action dated Jul. 5, 2016 in connection with JP application No. 2014-530764.

* cited by examiner

HIGH ENERGY MATERIALS FOR A BATTERY AND METHODS FOR MAKING AND USE

CROSS-REFERENCE TO RELATED APPLICATIONS

This application is a continuation of U.S. application Ser. No. 14/220,047, having a filing date of Mar. 19, 2014 entitled "High Energy Materials for a Battery and Methods for Making and Use", which is a continuation of International Application No. PCT/US2014/028478, having an international filing date of Mar. 14, 2014 entitled "High Energy Materials For A Battery And Methods For Making And Use," which claims priority to U.S. Provisional Application No. 61/786,598, filed Mar. 15, 2013 entitled "High Energy Materials For A Battery And Methods For Making And Use." This application claims priority to and the benefit of each of these applications, and each application is incorporated herein by reference in its entirety.

BACKGROUND OF THE INVENTION

The present invention is in the field of battery technology, and more particularly in the area of materials for making high-energy electrodes for batteries, including metal-fluoride materials.

One type of battery consists of a negative electrode made primarily from lithium and a positive electrode made primarily from a compound containing a metal and fluorine. During discharge, lithium ions and electrons are generated from oxidation of the negative electrode while fluoride ions are produced from reduction of the positive electrode. The generated fluoride ions react with lithium ions near the positive electrode to produce a compound containing lithium and fluorine, which may deposit at the positive electrode surface.

Metal fluoride based batteries are an attractive energy storage technology because of their extremely high theoretical energy densities. For example, certain metal fluoride active materials can have theoretical energy densities greater than about 1600 Wh/kg or greater than about 7500 Wh/L. Further, metal fluorides have a relatively low raw material cost, for example less than about $10/kg. However, a number of technical challenges currently limit their widespread use and realization of their performance potential.

One challenge for certain metal fluoride materials is comparatively poor rate performance. Many metal fluoride active materials have electrochemical potentials greater than about 2.5 V because of their relatively large bandgap produced by the highly ionic bonding between the metal and fluorine, and in particular between a transition metal and fluorine. Unfortunately, one of the drawbacks to wide bandgap materials is the intrinsically low electronic conductivity that results from the wide bandgap. As a result of this low conductivity, discharge rates of less than 0.1 C are required in order to obtain full theoretical capacity. More typically, discharge rates of 0.05 C to 0.02 C are reported in the literature. Such low discharge rates limit the widespread use of metal fluoride active materials.

Another challenge for certain metal fluoride active materials is a significant hysteresis observed between the charge and discharge voltages during cycling. This hysteresis is typically on the order of about 1.0V to about 1.5V. While the origin of this hysteresis is uncertain, current evidence suggests that kinetic limitations imposed by low conductivity play an important role. Further, asymmetry in the reaction paths upon charge and discharge may also play a role. Since the electrochemical potential for many of the metal fluorides is on the order of 3.0V, this hysteresis of about 1.0V to about 1.5V limits the overall energy efficiency to approximately 50%.

Limited cycle life is another challenge for certain metal fluoride active materials. Although rechargeability has been demonstrated for many metal fluoride active materials, their cycle life is typically limited to tens of cycles and is also subject to rapid capacity fade. Two mechanisms are currently believed to limit the cycle life for the metal fluoride active materials: agglomeration of metallic nanoparticles and mechanical stress due to volume expansion. It is believed that metal fluoride active materials can cycle by virtue of the formation during lithiation of a continuous metallic network within a matrix of insulating LiF. As the number of cycles increases, the metal particles tend to accumulate together into larger, discrete particles. The larger agglomerated particles in turn create islands that are electrically disconnected from one another, thus reducing the capacity and ability to cycle the metal fluoride active materials. The second limitation to extended cycle life is the mechanical stress imparted to the binder materials by the metal fluoride particles as a result of the volume expansion that occurs during the conversion reaction. Over time, the binder is pulverized, compromising the integrity of the cathode. Notably, for the metal fluoride $CuF_2$, no demonstrations of rechargeability have been reported.

For $CuF_2$, an additional challenge prevents rechargeability. The potential required to recharge a $CuF_2$ electrode is 3.55 V. However, in typical electrolytes for lithium ion batteries, Cu metal oxidizes to $Cu^{2+}$ at approximately 3.5 V vs. $Li/Li^+$. The oxidized copper can migrate to the anode, where it is irreversibly reduced back to Cu metal. As a result, Cu dissolution competes with the recharge of Cu+2LiF to $CuF_2$, preventing cycling of the cell.

The following papers and patents are among the published literature on metal fluorides that employ mixed conductors that are not electrochemically active within the voltage window of the metal fluoride: Badway, F. et al., *Chem. Mater.*, 2007, 19, 4129; Badway, F. et al., *J. Electrochem. Soc.*, 2007, 150, A1318; "Bismuth fluoride based nanocomposites as electrode materials" U.S. Pat. No. 7,947,392; "Metal Fluoride And Phosphate Nanocomposites As Electrode Materials" US 2008/0199772; "Copper fluoride based nanocomposites as electrode materials" US 2006/0019163; and "Bismuth oxyfluoride based nanocomposites as electrode materials" U.S. Pat. No. 8,039,149.

Certain embodiments of the present invention can be used to form electrochemical cells having metal fluoride active material that exhibit improved rate performance, improved energy efficiency, and improved cycle life when compared to prior batteries. Thus, these and other challenges can be addressed by embodiments of the present invention described below.

BRIEF SUMMARY OF THE INVENTION

Certain embodiments of the invention include an electrode for an electrochemical cell. An electrode is formed from an active material that includes a metal fluoride compound and a dopant included in the metal fluoride compound via a doping process using a dopant amount of 0.1 equivalents. The doping process induces the formation of a conductive metallic network in the active material. In some embodiments, the metal in the metal fluoride is copper or iron. In some embodiments, the dopant is selected from the group consisting of transition metals, chalcogens, halogens, alkali metals, alkaline metals, and rare-earth elements. In some embodiments, the dopant is mercury or selenium.

Certain embodiments include a method of making a composition for use in forming an electrode for a battery. The method includes doping a dopant into a metal fluoride compound, wherein the doping process induces the formation of a conductive metallic network in the active material. The method includes mixing the dopant and the metal fluoride compound and annealing the mixture.

Certain embodiments include the method of making an electrochemical cell containing high-energy cathode materials and methods of use of such electrochemical cells.

DETAILED DESCRIPTION OF THE INVENTION

Figure 1:
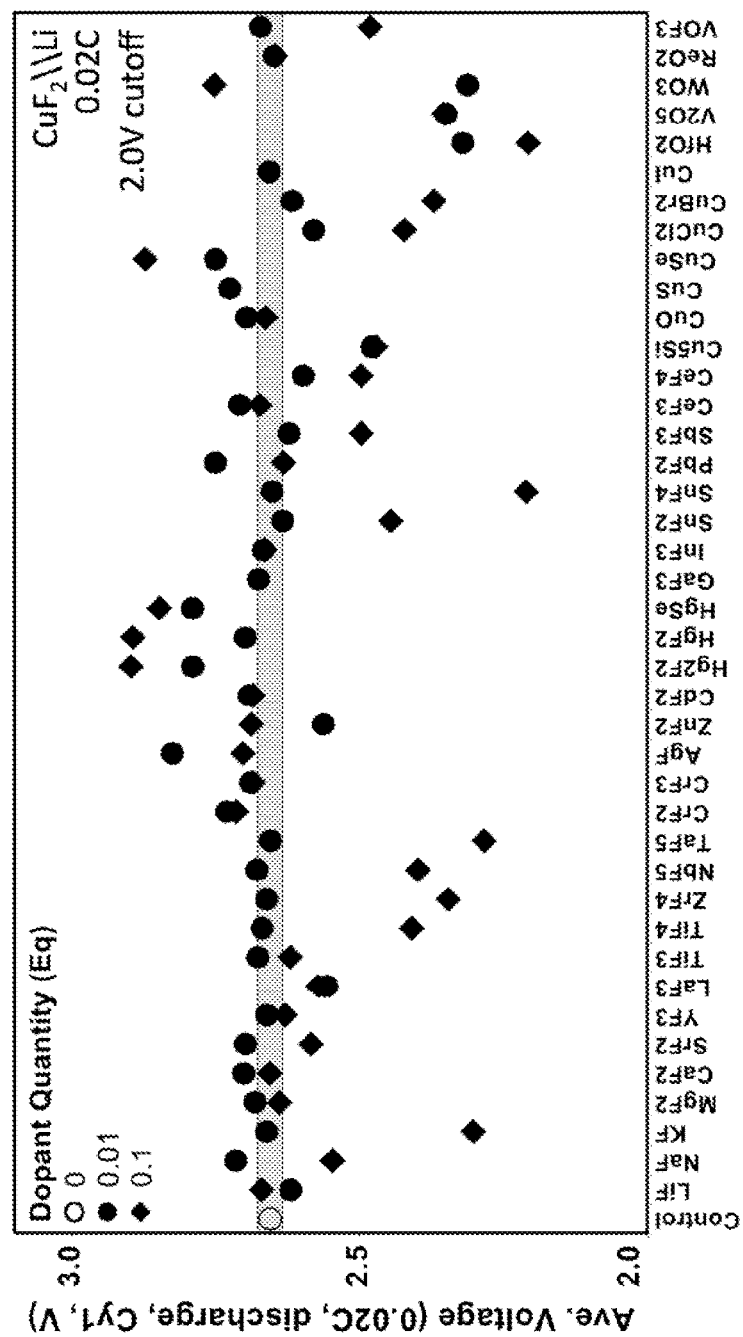
FIG. 1 illustrates characterization of voltage performance of several doped cathode materials as compared to an undoped control according to certain embodiments disclosed herein.

The following definitions apply to some of the aspects described with respect to some embodiments of the invention. These definitions may likewise be expanded upon herein. Each term is further explained and exemplified throughout the description, figures, and examples. Any interpretation of the terms in this description should take into account the full description, figures, and examples presented herein.

The singular terms "a," "an," and "the" include the plural unless the context clearly dictates otherwise. Thus, for example, reference to an object can include multiple objects unless the context clearly dictates otherwise.

The terms "substantially" and "substantial" refer to a considerable degree or extent. When used in conjunction with an event or circumstance, the terms can refer to instances in which the event or circumstance occurs precisely as well as instances in which the event or circumstance occurs to a close approximation, such as accounting for typical tolerance levels or variability of the embodiments described herein.

The term "about" refers to the range of values approximately near the given value in order to account for typical tolerance levels, measurement precision, or other variability of the embodiments described herein.

The terms "conductive," "conductor," "conductivity," and the like refer to the intrinsic ability of a material to facilitate electron or ion transport and the process of doing the same. The terms include materials whose ability to conduct electricity may be less than typically suitable for conventional electronics applications but still greater than an electrically insulating material.

The term "active material" and the like refers to the material in an electrode, particularly in a cathode, that donates, liberates, or otherwise supplies the conductive species during an electrochemical reaction in an electrochemical cell.

The term "transition metal" refers to a chemical element in groups 3 through 12 of the periodic table, including scandium (Sc), titanium (Ti), vanadium (V), chromium (Cr), manganese (Mn), iron (Fe), cobalt (Co), nickel (Ni), copper (Cu), zinc (Zn), yttrium (Y), zirconium (Zr), niobium (Nb), molybdenum (Mo), technetium (Tc), ruthenium (Ru), rhodium (Rh), palladium (Pd), silver (Ag), cadmium (Cd), hafnium (Hf), tantalum (Ta), tungsten (W), rhenium (Re), osmium (Os), iridium (Ir), platinum (Pt), gold (Au), mercury (Hg), rutherfordium (Rf), dubnium (Db), seaborgium (Sg), bohrium (Bh), hassium (Hs), and meitnerium (Mt).

The term "halogen" refers to any of the chemical elements in group 17 of the periodic table, including fluorine (F), chlorine (Cl), bromine (Br), iodine (I), and astatine (At).

The term "chalcogen" refers to any of chemical elements in group 16 of the periodic table, including oxygen (O), sulfur (S), selenium (Se), tellurium (Te), and polonium (Po).

The term "alkali metal" refers to any of the chemical elements in group 1 of the periodic table, including lithium (Li), sodium (Na), potassium (K), rubidium (Rb), cesium (Cs), and francium (Fr).

The term "alkaline earth metals" refers to any of the chemical elements in group 2 of the periodic table, including beryllium (Be), magnesium (Mg), calcium (Ca), strontium (Sr), barium (Ba), and radium (Ra).

The term "rare earth element" refers to scandium (Sc), yttrium (Y), lanthanum (La), cerium (Ce), praseodymium (Pr), neodymium (Nd), promethium (Pm), samarium (Sm), europium (Eu), gadolinium (Gd), terbium (Tb), dysprosium (Dy), holmium (Ho), erbium (Er), thulium (Tm), ytterbium (Yb), and lutetium (Lu).

A rate "C" refers to either (depending on context) the discharge current as a fraction or multiple relative to a "1 C" current value under which a battery (in a substantially fully charged state) would substantially fully discharge in one hour, or the charge current as a fraction or multiple relative to a "1 C" current value under which the battery (in a substantially fully discharged state) would substantially fully charge in one hour.

In certain embodiments, metal fluoride (MeFx) active materials are doped with cationic materials, anionic materials, or mixed materials. According to certain embodiments, the resulting doped cathode material demonstrates improved voltage performance with cation, anion, or mixed doping. Without being bound by a particular theory or mechanism of action, doping can improve the rate performance of metal fluoride active materials by improving the bulk conductivity of the resulting cathode material or favorably changing the bandgap of the cathode material. For example, improving the bulk conductivity of the active material can allow for discharge rates above the 0.1 C practical limit that is experienced with conventional conductive oxide matrix materials. Alternatively or additionally, the dopant can reduce the bandgap of the conductive matrix material and have a similar effect on the conductivity so as to improve the discharge rate of the doped cathode material. Alternatively, doping can induce the formation of a conductive metallic network upon discharge. Such networks have been shown to enhance conductivity in $FeF_3$ cathodes.

Formula (I) illustrates a general reaction scheme for cation doping of a $CuF_2$ active material:

$$CuF_2 + aMeF_y \rightarrow CuMe_aF_z \quad (I)$$

where y and z depend on the valence of the particular dopant (Me) selected. Preferred cation dopants include certain alkali metals (including, but not limited to, Li, Na and K), certain alkaline earth metals (including, but not limited to, Mg, Ca, and Sr), certain rare earth elements (including, but not limited to, Y, Ce, and La), ce$_3$,tain transition metals (including, but not limited to, Ti, Zr, Nb, Ta, Cr, Ag, Zn, Cd, and Hg), or certain post-transition metals (including, but not limited to, Ga, In, Sn, Pb, and Sb). According to certain embodiments, the cation dopant precursor (MeF$_y$) can be LiF, NaF, KF, MgF$_2$, CaF$_2$, SrF$_2$, YF$_2$, LaF$_3$, TiF$_3$, TiF$_4$, ZrF$_4$, NbF$_5$, TaF$_5$, CrF$_2$, CrF$_3$, AgF, ZnF$_2$, CdF$_2$, Hg$_2$F$_2$, HgF$_2$, GaF$_3$, InF$_3$, SnF$_2$, SnF$_4$, PbF$_2$, SbF$_3$, CeF$_3$, CeF$_4$, or combinations thereof.

Formula (II) illustrates a general reaction scheme for anion doping of a CuF$_2$ active material:

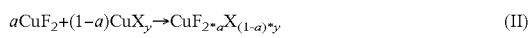

$$aCuF_2 + (1-a)CuX_y \rightarrow CuF_{2 \cdot a}X_{(1-a) \cdot y} \quad (II)$$

where y depends on the valence of the particular dopant (X) selected. Preferred anion dopants include certain halogens (including, but not limited to, Cl, Br, and I) and certain chalcogens (including, but not limited to, O, S, and Se). According to certain embodiments, the anion dopant precursor (CuX$_y$) can be Cu$_5$Si, CuO, CuS, CuSe, CuCl$_2$, CuBr$_2$, CuI, and combinations thereof.

Formula (III) illustrates a general reaction scheme for mixed doping of a CuF$_2$ active material:

$$CuF_2 + aMeX_y \rightarrow CuMe_aF_bX_c \quad (III)$$

where b and c depend on the valence of the particular dopant selected. Preferred anion dopants include certain combinations of transition metals and chalcogens. According to certain embodiments, the mixed dopant precursor (MeX$_y$) can be HgSe, HfO$_2$, V$_2$O$_5$, WO$_3$, ReO$_2$, VOF$_3$, and combinations thereof.

While the above formulas and certain of the examples herein employ CuF$_2$ as the metal fluoride active material, it is understood that other metal fluoride active materials, such as FeF$_3$, NiF$_2$, and BiF$_3$ are within the scope of the disclosure.

For illustration of doping amounts, doped active materials doped according to Formulas (I), (II), and (III) can have the following doping ratios under certain conditions:

Doping=0.01
I—0.99CuF$_2$+0.01MeF$_y$→Cu$_{0.99}$Me$_{0.01}$F$_2$
II—0.99CuF$_2$+0.01CuX$_y$→CuF$_{1.98}$X$_{0.02}$
III—0.99CuF$_2$+0.01MeX$_y$→Cu$_{0.99}$Me$_{0.01}$F$_{1.98}$X$_{0.02}$ Doping=0.10
I—0.90CuF$_2$+0.10MeF$_y$→Cu$_{0.90}$Me$_{0.10}$F$_2$
II—0.90CuF$_2$+0.10CuX$_y$→CuF$_2$X$_{0.10}$
III—0.90CuF$_2$+0.10MeX$_y$→Cu$_{0.90}$Me$_{0.10}$F$_{1.80}$X$_{0.20}$ FIG. 1 illustrates the results of electrochemical characterization of certain embodiments disclosed herein. Specifically, the voltages of several doped CuF$_2$ materials are compared to an undoped control. FIG. 1 depicts the discharge voltage on first cycle at a discharge rate of 0.02 C. The doping of CuF$_2$ was carried out in 0.01 and 0.1 equivalents. Some of the dopants are cation dopant, some are anion dopants, and some are mixed. Many of the dopants improved the voltage performance of the cathode as compared to control. For example, the cation dopant Hg and the anion dopant Se both demonstrated about a 2.9 V discharge voltage when doped at 0.1 equivalents.

Figure 2:
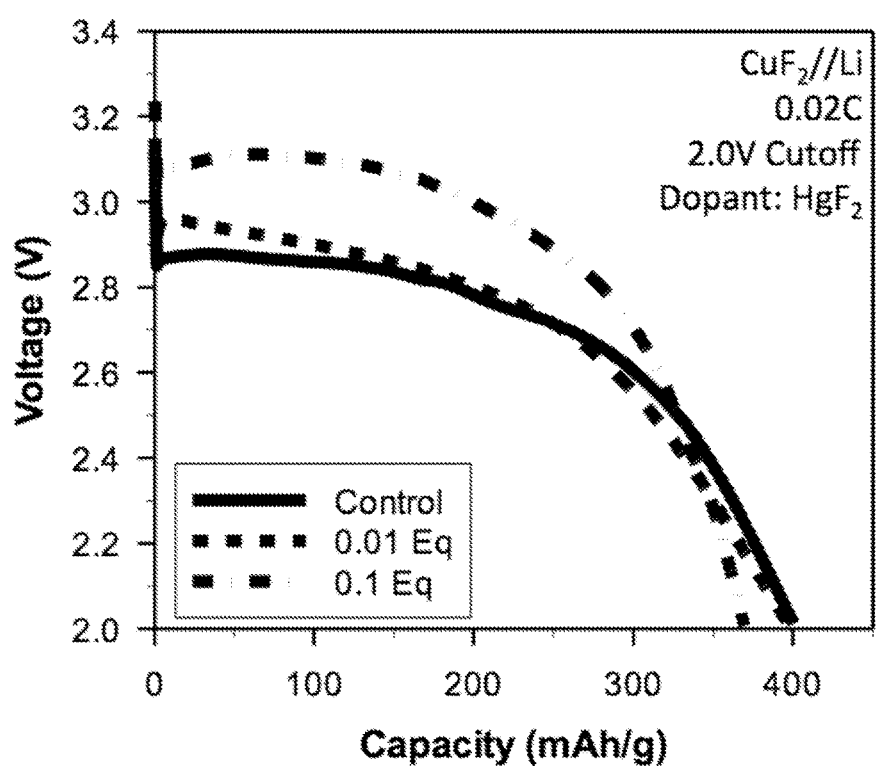
FIG. 2 illustrates electrochemical characterization of certain metal fluoride active materials doped with two different levels of cation dopants according to certain embodiments disclosed herein.

FIG. 2 illustrates the results of electrochemical characterization of certain embodiments disclosed herein. Specifically, the voltage traces of CuF$_2$ active materials doped with two different levels of Hg (0.1 and 0.01 equivalents) are compared to an undoped CuF$_2$ material. FIG. 2 demonstrates that the Hg dopant at 0.1 equivalents in the metal fluoride active material increased the voltage at comparable capacities as compared to the undoped control. For example, at 100 mAh/g the CuF$_2$ active material doped with Hg at 0.1 equivalents had a voltage of about 3.1V as compared to about 2.8V for the undoped CuF$_2$.

Figure 3:
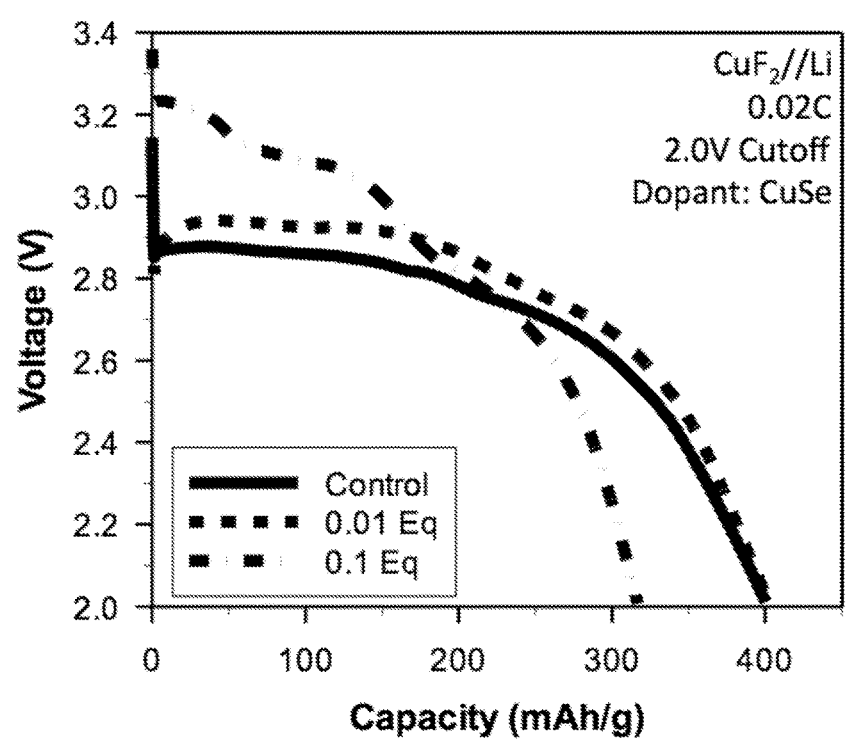
FIG. 3 illustrates electrochemical characterization of certain metal fluoride active materials doped with two different levels of anion dopants according to certain embodiments disclosed herein.

FIG. 3 illustrates the results of electrochemical characterization of certain embodiments disclosed herein. Specifically, the voltage traces of CuF$_2$ active materials doped with two different levels of Se (0.1 and 0.01 equivalents) are compared to an undoped CuF$_2$ material. FIG. 3 demonstrates that the Se dopant at 0.1 equivalents in the metal fluoride active material increased the voltage at comparable capacities as compared to the undoped control. For example, at 100 mAh/g the CuF$_2$ active material doped with Se at 0.1 equivalents had a voltage of about 3.1V as compared to about 2.8V for the undoped CuF$_2$.

EXAMPLES

The following examples describe specific aspects of some embodiments of the invention to illustrate and provide a description for those of ordinary skill in the art. The examples should not be construed as limiting the invention, as the examples merely provide specific methodology useful in understanding and practicing some embodiments of the invention.

Example 1—Fabrication of Electrodes Using Doped Materials

Synthesis.

Doped metal fluoride active materials were synthesized using a process that includes both milling and annealing. Typically, metal fluoride precursors (e.g., CuF$_2$, FeF$_3$) were milled together with the dopant precursor (e.g., HgF$_2$, CuSe), followed by an annealing step. The temperature of the annealing step depends upon the choice of metal fluoride, but is typically performed at 200 degrees C.

Electrode Formulation.

Cathodes were prepared using a formulation composition of 80 wt % active material, 15 wt % binder, and 5 wt % conductive additive according to the following formulation method: about 133 mg PVDF (Sigma Aldrich) and about 44 mg Super P Li (Timcal) was dissolved in 10 mL NMP (Sigma Aldrich) overnight. 70 mg of coated CuF$_2$ powder was added to 1 mL of this solution and stirred overnight. Films were cast by dropping about 70 L of slurry onto stainless steel current collectors and drying at 150 degrees C. for about 1 hour. Dried films were allowed to cool, and were then pressed at 1 ton/cm$^2$. Electrodes were further dried at 150 degrees C. under vacuum for 12 hours before being brought into a glove box for battery assembly.

Example 2—Electrochemical Characterization of Electrochemical Cells Containing Doped Electrodes All batteries were assembled in a high purity argon filled glove box (M-Braun, O$_2$ and humidity contents <0.1 ppm), unless otherwise specified. Cells were made using lithium as an anode, Celgard 2400 separator, and 90 L of 1M LiPF$_6$ in 1:2 EC: EMC electrolyte. Electrodes and cells were electrochemically characterized at 30 degrees C. with a constant current C/50 charge and discharge rate between 4.0 V and 2.0 V. FIGS. 1 through 3 depict certain results of electrochemical characterization.

Certain embodiments disclosed herein relate to a composition for use in forming a cathode for a battery, and the composition includes a metal fluoride compound doped with a dopant. The addition of the dopant: (i) improves the bulk conductivity of the composition as compared to the undoped metal fluoride compound; (ii) changes the bandgap of the composition as compared to the undoped metal fluoride compound; or (iii) induces the formation of a conductive metallic network. In some embodiments, the metal in the metal fluoride is copper or iron. In some embodiments, the dopant is selected from the group consisting of transition metals, chalcogens, halogens, alkali metals, alkaline metals, and rare-earth elements. In some embodiments, the dopant is selected from the group consisting of transition metals and chalcogens. In some embodiments, the dopant is a transition metal. In some embodiments, the dopant is a chalcogen. In some embodiments, the dopant is mercury. In some embodiments, the dopant is selenium.

Certain embodiments disclosed herein relate to a method of making a composition for use in forming a cathode for a battery. The method includes doping a dopant into a metal fluoride compound. The addition of the dopant: (i) improves the bulk conductivity of the composition as compared to the undoped metal fluoride compound; (ii) changes the bandgap of the composition as compared to the undoped metal fluoride compound; or (iii) induces the formation of a conductive metallic network. In some embodiments, the doping includes mixing the dopant and the metal fluoride compound and annealing the mixture.

Certain embodiments include a cathode formed using any of the compositions disclosed herein or a cathode formed using any of the methods disclosed herein. Certain embodiments include a battery formed from such cathodes.

While the invention has been described with reference to the specific embodiments thereof, it should be understood by those skilled in the art that various changes may be made and equivalents may be substituted without departing from the true spirit and scope of the invention as defined by the appended claims. In addition, many modifications may be made to adapt a particular situation, material, composition of matter, method, or process to the objective, spirit and scope of the invention. All such modifications are intended to be within the scope of the claims appended hereto. In particular, while the methods disclosed herein have been described with reference to particular operations performed in a particular order, it will be understood that these operations may be combined, sub-divided, or re-ordered to form an equivalent method without departing from the teachings of the invention. Accordingly, unless specifically indicated herein, the order and grouping of the operations are not limitations of the invention.

We claim:

1. An electrode formed from an active material, comprising:
    a copper fluoride compound; and
    an elemental dopant included in the copper fluoride compound via a doping process, wherein the dopant comprises a transition metal.

2. The electrode of claim 1 wherein the doping process includes a mixing step.

3. The electrode of claim 1 wherein the doping process includes an annealing step.

4. The electrode of claim 1 wherein the doping process uses a dopant amount of 0.1 equivalents or less.

5. The electrode of claim 1 wherein the doping process uses a dopant amount of 0.01 equivalents or less.

6. The electrode of claim 1 wherein the doping process uses a dopant amount of greater than 0.1 equivalents.

7. A method of making a composition for use in forming an electrode for a battery comprising doping an elemental dopant into a copper fluoride compound, wherein the doping process induces the formation of a conductive metallic network in the active material.

8. The method of claim 7 wherein doping comprising mixing the dopant and the copper fluoride compound and annealing the mixture.

9. The method of claim 7 wherein the dopant is selected from the group consisting of transition metals, chalcogens, halogens, alkali metals, alkaline metals, and rare-earth elements.

10. The method of claim 7 wherein the dopant is selected from the group consisting of transition metals and chalcogens.

11. The method of claim 7 wherein the dopant is a transition metal.

12. A battery comprising the electrode of claim 1.

* * * * *